United States Patent [19]
Clerc et al.

[11] Patent Number: 4,766,428
[45] Date of Patent: Aug. 23, 1988

[54] THREE-DIMENSIONALLY CONTROLLED LIQUID CRYSTAL MATRIX DISPLAY AND ITS CONTROL PROCESS

[75] Inventors: Jean-Frédéric Clerc, St Egreve; Thierry Leroux, Fontaine, both of France

[73] Assignee: Commissariat a l'Energie Atomique, Paris, France

[21] Appl. No.: 847,735

[22] Filed: Apr. 3, 1986

[30] Foreign Application Priority Data

Apr. 5, 1985 [FR] France .................. 85 05247

[51] Int. Cl.$^4$ ............................................. G09G 3/36
[52] U.S. Cl. ..................................... 340/784; 350/336
[58] Field of Search ............... 340/718, 719, 752, 784; 350/336, 350 S, 350 R

[56] References Cited

U.S. PATENT DOCUMENTS

| | | | |
|---|---|---|---|
| 3,776,615 | 12/1973 | Tsukamoto et al. | 340/784 |
| 3,787,834 | 1/1974 | Elliott | 340/784 |
| 4,447,812 | 5/1984 | Soneda et al. | 340/784 |

FOREIGN PATENT DOCUMENTS

| | | |
|---|---|---|
| 2385165 | 10/1978 | France . |
| 2532455 | 2/1984 | France . |
| 2069213 | 8/1981 | United Kingdom . |

OTHER PUBLICATIONS

Patents Abstracts of Japan, vol. 7, N. 138 (P-204) (1283), Jun. 16, 1983 and JP-A-5854317.

Primary Examiner—Gerald L. Brigance
Assistant Examiner—Mahmoud Fatahi-Yar
Attorney, Agent, or Firm—Pearne, Gordon, McCoy & Granger

[57] ABSTRACT

The invention relates to a three-dimensionally controlled liquid crystal matrix display having a low number of connections and transistors to its control process. The display comprises a first insulating wall covered with electrode rows, each formed from n aligned row strips, a second insulating wall covered with electrode columns, each formed by r aligned column strips, and a liquid crystal layer inserted between the electrode columns and the electrode rows. The row strips and the column strips are respectively grouped into p first and second packets of s parallel row strips, and of t parallel column strips, with $p = n \times r$, $s = m \times n/p$ and $t = q \times r/p$. Each row strip and each column strip is associated respectively with a transistor serving to interconnect the row strips and interconnect the column strips to form s row connections, t column connections, and p packet connections.

6 Claims, 3 Drawing Sheets

FIG. 1a PRIOR ART
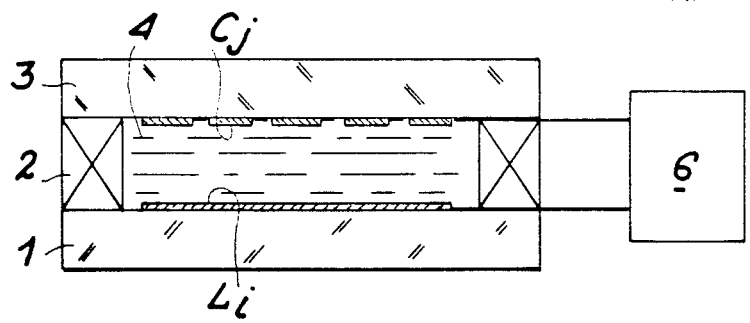
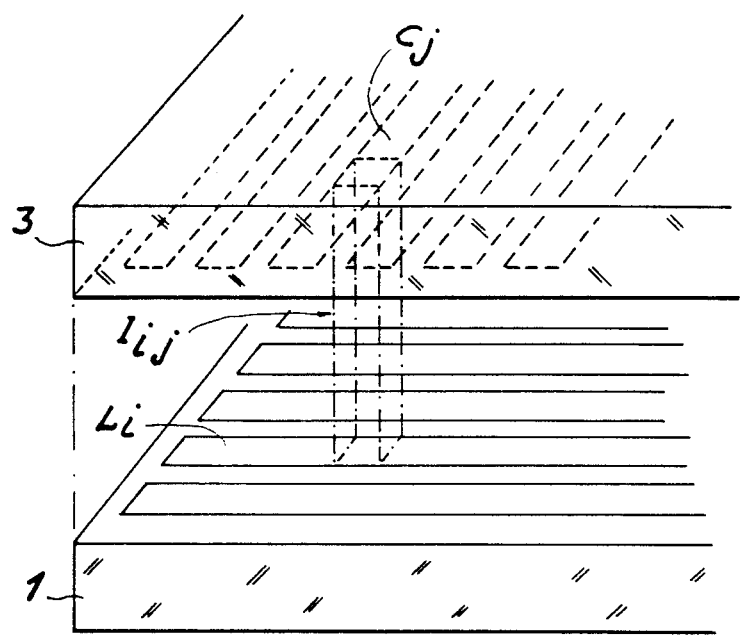
FIG. 1b PRIOR ART

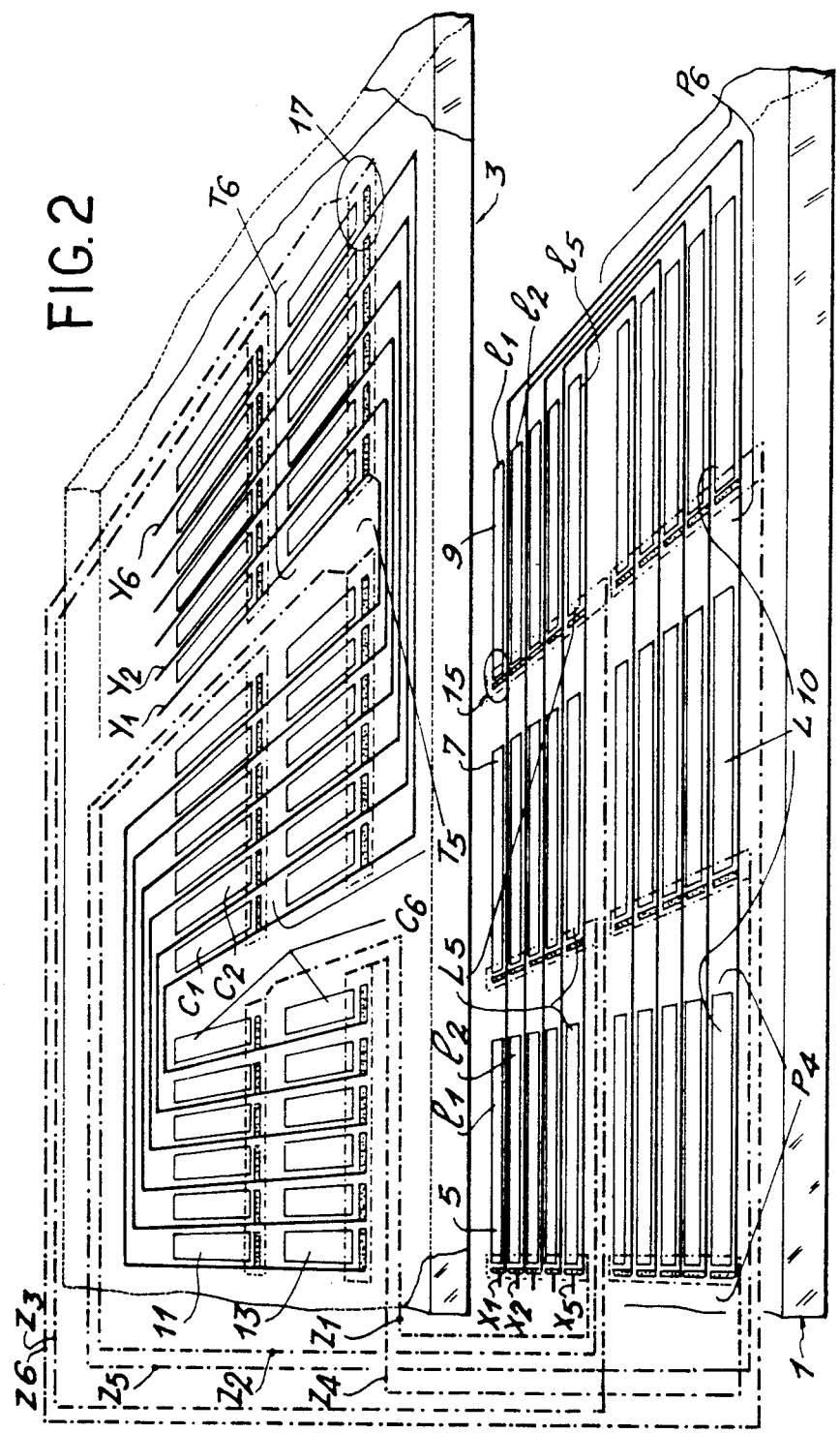

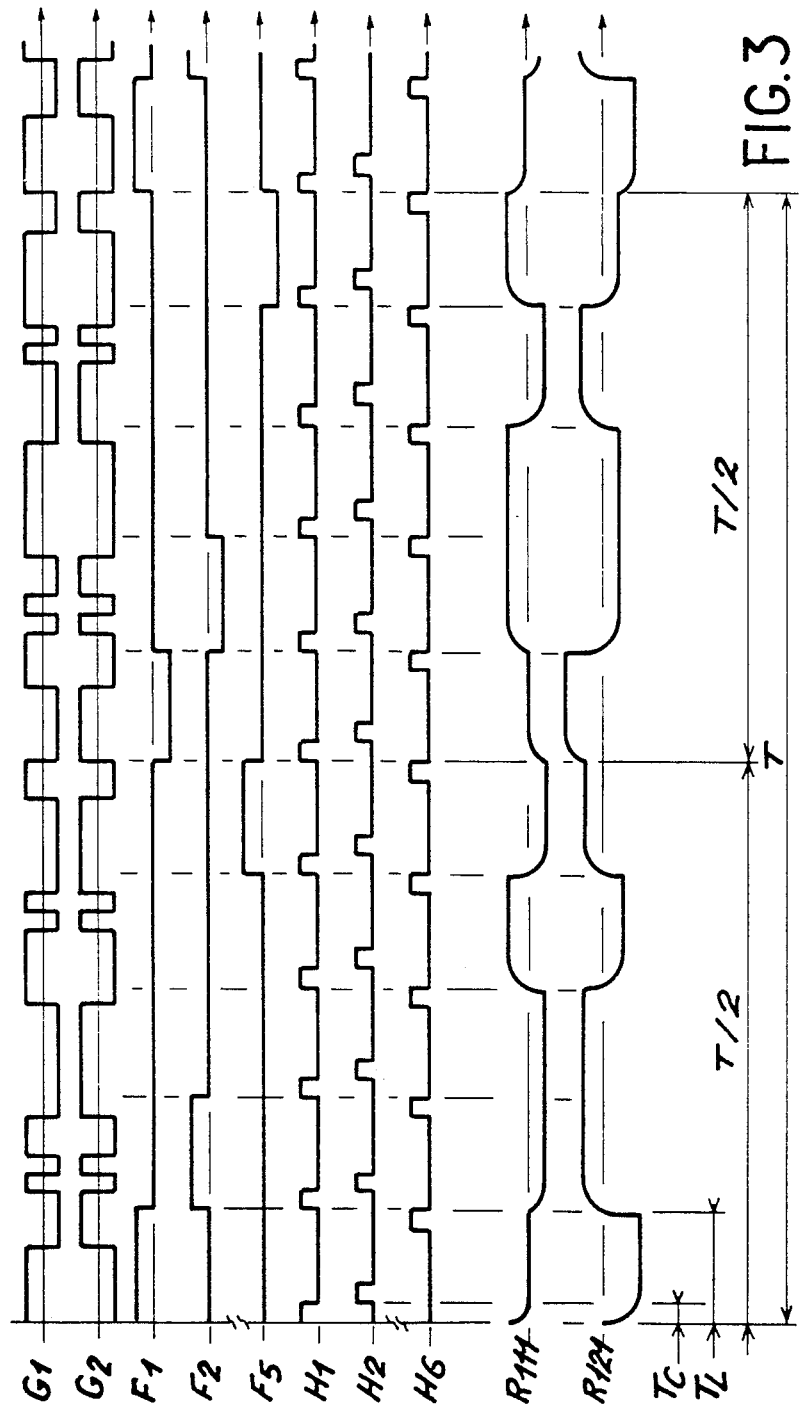

THREE-DIMENSIONALLY CONTROLLED LIQUID CRYSTAL MATRIX DISPLAY AND ITS CONTROL PROCESS

BACKGROUND OF THE INVENTION

The present invention relates to a three-dimensionally controlled liquid crystal matrix display and to the control process for the same.

The invention more particularly applies to the field of optoelectronics and especially to the control of liquid crystal matrix displays, e.g. used as converters of electrical information into optical information, for the real time processing of optical images and for analogue display purposes.

FIG. 1a shows a cross-bar liquid crystal matrix display according to the prior art and FIG. 1b is an exploded view thereof. FIG. 1a shows two facing insulating walls 1, 3, which are kept spaced by a sealing joint 2 arranged on the peripheries thereof and between which is introduced a liquid crystal layer 4.

Over the inner face of wall 1 is distributed a first group of m parallel electrode rows, designated $L_i$, with i being an integer such that $1 \leq i \leq m$, constituted by continuous conductive strips, whilst on the inner face of the other wall 3 is distributed a second group of q parallel electrode columns, designated $C_j$, with j being an integer such that $1 \leq j \leq q$, whilst also being formed by conductive strips, the m and q columns of electrodes crossing one another. These m electrode rows and q electrode columns carry electrical signals, respectively row signal and column signals suitable for the excitation of the liquid crystal. The signals are produced in per se known manner by a power supply 6.

FIG. 1b shows an exploded view of the display with a first group of m electrode rows, designated $L_i$ and a second group of q electrode columns, designated $C_j$, which are respectively distributed over walls 1 and 3. As the q electrode columns and m electrode lines cross one another, a liquid crystal zone $I_{ij}$ is defined by the overlap region of row $L_i$ and the column $C_j$. Each zone $I_{ij}$ defines and elementary image point of the display means, so that the latter comprises mxq image points distributed in matrix-like manner.

In general terms, to the m rows and q columns of electrodes are applied alternating electric signals in phase or in phase opposition, the amplitude of the row signals slightly exceeding that of the column signals.

When the signal of row $L_i$ and the signal of column $C_j$ are in phase, the resulting signal is equal to the difference of the amplitudes in absolute value of the row signal and the column signal. The resulting signal is then below the threshold voltage $V_s$ of the liquid crystal, corresponding to the minimum voltage necessary for exciting the liquid crystal. In addition, in the overlap zone $I_{ij}$, as the liquid crystal is not excited, a black point is displayed. Conversely when the signal of row $L_i$ and the signal of column $C_j$ are in phase opposition, the resulting signal has an amplitude equal to the sum of the amplitudes in absolute value of the row signal and the column signal. The resulting signal produces an electric field in the overlap zone $I_{ij}$, which generally brings about a collective orientation of molecules in said zone and consequently a white display.

By utilizing the selective orientation of the molecules and the punctiform excitation of the liquid crystal, an image is made to appear on the complete cell.

According to another type of known matrix display (called active matrix display), a counter electrode is provided in one wall and the electrode walls and columns are provided on the other wall.

With the intersection of each row and each column is e.g. associated a switch, such as a thin film transistor connected to a point electrode and, which transmits to the corresponding zone $I_{ij}$ defined by the overlapping of the point electrode and the counter-electrode, the signal resulting form the row signal applied to row $L_i$ and the column signal applied to column $C_j$. Thus, there are the same number of transistors as there are image points.

In the aforementioned matrix display, in order to display mxq points, use is consequently made of a large number of transistors mxq, as well as a large number of connections m+q, said connections corresponding to all the inputs of electrical signals on the m rows and the q columns of electrodes.

SUMMARY OF THE INVENTION

The object of the invention is to obviate these disadvantages by providing a display having a number of connections and transistors below those of the prior art means, without it being necessary to reduce the number of elementary image points.

More specifically the present invention relates to a liquid crystal matrix display comprising two facing insulating walls, respectively covered by a first group of m electrode rows and a second group of q electrode columns, said rows and columns crossing on another, a liquid crystal layer placed between the first and second groups, and means for applying electrical signals to the electrodes permitting the excitation of the liquid crystal, wherein each electrode of the first group is constituted by n small row strips, wherein each electrode of the second group is constituted by r small column strips, the small rows and the small columns being respectively grouped into p row packets and p column packets with $p = n \cdot r$ each row packet grouping s small parallel rows and each column packet grouping t small parallel columns with $s = m \cdot n/p$ and $t = q \cdot r/p$, an image point $I_{ijk}$ being defined by the region corresponding to the superimposing of a small row $l_i$ of a row packet $P_k$ and a small column $c_j$ of the corresponding packet $T_k$, i, j, and k being integers such that $1 \leq i \leq s$, $1 \leq j \leq t$ and $1 \leq k \leq p$, wherein each small row is associated with a switch serving on the one hand to interconnect the n small rows of an electrode row and interconnect the electrode rows in order to form s row connections and on the other hand to interconnect the s small rows of each row packet $P_k$ in order to form p first packet connections and wherein each small column is associated with a switch serving on the one hand to interconnect the r small columns of an electrode column and interconnect the electrode columns in order to form t column connections and on the other hand interconnect the t small columns of each column packet $T_k$ in order to form p second packet connections, the row packet $P_k$ and the column packet $T_k$ being interconnected by the first and second corresponding packet connections.

According to an embodiment of the display, the electrode rows $(L_a)$, $(L_{2s+1-a})$, $(L_{2s+a})$, $(L_{4s+1-a})$ and so on are interconnected to form s row connections and the electrode columns $(C_b)$, $(C_{2t+1-b})$, $(C_{2t+b})$, $(C_{4t+1-b})$ and so on are interconnected to form t column connections, a and b being integers such that $1 \leq a \leq m$ and $1 \leq b \leq q$.

According to another embodiment of the display, the electrode rows ($L_a$), ($L_{a+s}$), ($L_{a+2s}$), ($L_{a+3s}$) and so on are interconnected to form s row connections and the electrode column ($C_b$), ($C_{b+t}$), ($C_{b+2t}$), ($C_{b+3t}$) and so on are interconnected to form t column connections, a and b being integers such that $1 \leq a \leq m$ and $1 \leq b \leq q$.

According to a preferred embodiment of the display, the switches are thin film transistors.

The invention also relates to a process for the control of a display according to the invention, wherein there is a continuous application to the t column connections of cyclic electric signals of cycle T with polarity reversal for each half-cycle T/2, said column signals being alternately positive and then negative on each half-cycle T/2, applying to the s row connections cyclic pulse-type electric signals of cycle T with polarity reversal for each half-cycle T/2, each row signal being non-zero during a row time $T_L = T/(2 \cdot s)$, all the row times being distributed over a half-cycle T/2, and applying to p packet connections cyclic pulse-type electric signals of cycle $T_L$, each packet signal being non-zero during a time $T_C = T_L/p$, all the times $T_C$ being distributed over a time $T_L$, $T_C$ corresponding to the charging time of a switch.

According to a preferred embodiment of this process, the row signals and the column signals are either in phase or in phase opposition.

According to another preferred embodiment of the process, with the switch being a transistor, the packet signals either select the conductive state, or the non-conductive state of said transistors associated with the packet connections.

According to another embodiment of the process, the electrical signals applied are square-wave signals.

BRIEF DESCRIPTION OF THE DRAWINGS

The invention is described in greater detail hereinafter relative to non-limitative embodiments and the attached drawings, wherein show:

FIGS. 1a and 1b, already described, in section and in exploded view a cross-bar matrix display according to the prior art.

FIG. 2 diagrammatically and in an exploded view an embodiment of a matrix display according to the invention.

FIG. 3 the timing diagram of the different signals applied to the different connections of the display of FIG. 2, as well as examples of the resulting signals at the corresponding image points.

DETAILED DESCRIPTION OF THE PREFERRED EMBODIMENTS

FIG. 2 shows an embodiment of a matrix display according to the invention. The present display, like those of the prior art (FIG. 1), has two facing walls 1, 3, respectively covered by a first group of m electrode rows, designated $L_a$ and a second group of q electrode columns designated $C_b$, a and b being integers such that $1 \leq a \leq m$ and $1 \leq b \leq q$. A liquid crystal layer 4 is placed between the two groups of electrodes.

According to the invention, the first group of m electrode rows is constituted by discontinuous conductive strips, each formed by n small row strips 5, 7, 9. In the same way the second group of q electrode columns is constituted by discontinuous conductive strips, each formed by r small column strips 11, 13. In this way $m \cdot n$ small rows and $q \cdot r$ small columns are obtained. All the small rows and small columns are respectively grouped into p row packets and p column packets with $p = n \cdot r$ arranged in matrix-like manner.

In the example of FIG. 2, $m = 10$, $n = 3$, $q = 18$, and $r = 2$, so that there are 30 small rows and 36 small columns grouped into $p = 6$ packets.

Each row packet, designated $P_k$ is therefore constituted by s small rows, designated $l_i$, whilst each column packet, designated $T_k$, is constituted by t small columns, designated $c_j$, with $s = m \cdot n/p$ and $t = q \cdot r/p$ i, j and k being integers such that $1 \leq i \leq s$, $1 \leq j \leq t$ and $1 \leq k \leq p$. In the example of FIG. 2, we therefore obtain $s = 5$ and $t = 6$.

With such a display, an image point $I_{ijk}$ is defined by the overlap region between a small row $l_i$ of a row packet $P_k$ and a small column $c_j$ of the corresponding column packet $T_k$.

In order to control said display means with each small row $l_i$ and with each small column $c_j$ is respectively associated a switch 15, 17, such as a thin film transistor, connected to each small row $l_i$ and to each small column $c_j$ by the drain (or source) thereof. The transistors 15 associated with the small rows, designated $l_i$, thus permit via their source (or their drain) to interconnect the n small rows constituting an electrode row and to interconnect the rows ($L_a$), ($L_{a+s}$), ($L_{a+2s}$) etc or the rows ($L_a$), ($L_{2s+1-a}$), ($L_{4s+1-a}$), etc, as in the example of the drawing, in order to form s row connections, designated $X_i$. Thus, in the example of FIG. 2, row $L_i$ is connected to row $L_{10}$, row $L_2$ to row $L_9$ and so on, thus forming 5 row connections.

By means of their gate, transistors 15 also make it possible to interconnect the s small rows of each row packet $P_k$ to form p first packet connections, designated $Z_k$, p being equal to 6 in the case of the drawing.

The transistors 17 associated with the small columns, designated $c_j$, make it possible via their source (or their drain), to interconnect the r small columns forming an electrode column and to interconnect the columns ($C_b$), ($C_{b+t}$), ($C_{b+2t}$); etc or the columns ($C_b$), ($C_{2t+1-b}$), ($C_{2t+b}$), ($C_{4t+1-b}$), etc, as in the example of the drawing, to form t column connections, designated $Y_j$.

Thus, FIG. 2 shows column $C_1$ connected to column $C_{12}$, itself connected to column $C_{13}$, column $C_2$ connected to column $C_{11}$, itself connected to column $C_{14}$ and so in this way $t = 6$ column connections $Y_j$ are obtained.

By means of their gate, transistor 17 also make it possible to interconnect the t small columns of each column packet $T_k$ to form p second packet connections, designated $Z_k$.

The row packet $P_k$ and the column packet $T_k$ are interconnected by first and second corresponding packet connections to form p packet connections, designated $Z_k$.

In the above description, two connecting modes of the electrode rows and electrode columns have been given for forming respectively s row connections and t column connections, but any other connecting mode making it possible to obtain s row connections and t column connections can be envisaged without passing beyond the scope of the invention. Thus, there are s row connections, designated $X_i$, t column connections, designated $Y_j$ and p packet connections, designated $Z_k$, i, j and k being integers such that $1 \leq i \leq s$, $1 \leq j \leq t$ and $1 \leq k \leq p$, with $s = 5$, $t = 6$ and $p = 6$ in the present example.

Each overlap zone between the small row strip, $l_i$ of a packet $P_k$ and the small column strip $C_j$ of the corresponding packet $T_k$ defines an point $I_{ijk}$. The signal which is seen by this image point consequently results from the superimposing of a signal applied to the corresponding row connection $X_i$, called the row signal $F_i$, a signal applied to the corresponding column connection $Y_j$, called column signal $G_j$ and a signal applied to the corresponding packet connection $Z_k$, called packet signal $H_k$. The signal resulting at image point $I_{ijk}$ will be designated $R_{ijk}$.

The control of such a display means consequently takes place by superimposing three types of different signals $F_i$, $G_j$, $H_k$, said control type consequently being called three-dimensional control.

Row signal $F_i$ is received by all the transistors 15 interconnected by their source (or their drain) and associated with the small row strips $l_i$ corresponding thereto. The column signal $G_j$ is received by all the transistors 17 interconnected by their source (or their drain) and associated with the corresponding small column strip $c_j$.

Conversely, the packet signal $H_k$ permits the passage or not of row signal $F_i$ and column signal $G_j$ on row $l_i$ and column $c_j$ respectively of packet $P_k$, $T_k$, which makes it possible to differentiate the different small row strips $l_i$ of the p row packets $P_k$ and the different small column strips $c_j$ of the p column packets $T_k$. Thus, transistors 15, 17 of the corresponding packets $P_k$, $T_k$ are selected at the same time and according to the signal applied are in the passing or conductive state, which is the case when they permit the passage of row signal $F_i$ and column signal $G_j$ respectively on row $l_i$ of packet $P_k$ and column $c_j$ of the corresponding packet $T_k$, or in the high impedance state and in this case they permit no signal to pass.

Thus, by means of a display according to the invention, on the basis of m rows, q columns and p packets respectively of s small rows and t small columns, we obtain m·q=s·t·p image points using only (s+t)·p transistors and s+t+p connections.

In the embodiment shown in FIG. 2, there are 10 rows (m), 18 columns (q) and 6 packets (p) of 5 small row (s) and 6 small columns (t) in each case. Thus, with such a display, it is possible to display 180 points using 66 transistors and 17 connections, whereas with a prior art display with 10 rows (m) and 18 columns (q), it is possible to display 180 points using 180 transistors (m·q) and 28 connections (m+q).

The transistors used here are preferably thin film transistors.

FIG. 3 shows the timing chart of the different control signals of the display of FIG. 2. It is possible to see two examples of column signals $G_1$ and $G_2$ applied to the column connections $Y_1$, $Y_2$, the row signals $F_1$, $F_2$ ... $F_5$ applied to the different row connections $X_1$, $X_2$ ... $X_5$, the packet signals $H_1$, $H_2$ ... $H_6$ applied to the different packet connections $Z_1$, $Z_2$ ... $Z_6$, as well as two examples of the resulting signals $R_{111}$ and $R_{121}$ at the corresponding image points $I_{111}$ and $I_{121}$.

The row signals $F_1$, $F_2$ ... $F_5$ and column signals $G_1$, $G_2$ ... $G_6$ of the display are in particular square-wave signals of cycle T. The polarity of these signals is reversed for each half-cycle T/2 to protect the liquid crystal from direct currents and therefore extend its life. Thus, the mean value of these signals is 0 in each cycle.

Time T/2 corresponds to the periodic or cyclic refreshening of the information in the liquid crystal and consequently to maintaining the points excited. Time T/2 is generally approximately 20 ms.

The row signals $F_1$, $F_2$ ... $F_5$ are of the pulse type and are non-zero during a row time $T_L$ equal to T/(2·s), s representing the number of row connections of the display means. The s row times are thus distributed over each half-cycle T/2, whereby a single non-zero pulse of a row signal corresponds to each time $t_L$. Time $T_L$ is the time necessary for storing the signal. In the described case s=5, the duration of the different signals $F_1$, $F_2$ ... $F_5$ being respectively T/10, i.e. approximately ms.

The column signal $G_j$ is applied continuously and is either in phase with the row signal $F_i$ in question and in this case the corresponding image point is black, or in phase opposition therewith and in this case the image point is white, with i and j in the display described being integers such that $1 \leq i \leq 5$ and $1 \leq j \leq 6$. In the example of FIG. 3, the signals $G_1$ and $G_2$ relative to the column connections $Y_1$ and $Y_2$ are identical, but of opposite polarity. As a function of the desired display, either the column signal $G_1$ or the column signal $G_2$ is delivered to the column connections $Y_1$ or $Y_2$.

Packet signals $H_1$, $H_2$ ... $H_6$ control both the state of the transistors associated with the small row strips, designated $l_i$, of a row packet $P_k$ and those associated with the small column strip $c_j$ of the corresponding column packet $T_k$, with k being an integer such that $1 \leq k \leq 6$. The packet signals are pulse-type square-wave signals. The duration of these signals, designated $T_C$, is equal to $T_L/p$, p representing the number of packet connections $Z_k$ and $T_L$ the row time, so that $T_C$ is equal to T/(2·s·p). Thus, time $T_C$ corresponds to the charging time of a transistor. The p times $T_C$ are distributed over each time $T_L$, whereby to the latter corresponds a single non-zero pulse of a packet signal. In the case of the example described s=5 and p=6, so that $T_C$ has a duration of approximately 0.66 ms.

During this time $T_C$, a packet connection $Z_k$ receives the pulse signal $H_k$, the transistors 15 associated with the small row strips of packet $P_k$ and the transistors 17 associated with the small column strips of packet $T_k$ are in the passing state. Outside a pulse over the remainder of a row time $T_L$, the packet signal $H_k$ is zero, the transistors 15, 17 of the corresponding packets $P_k$ and $T_k$ are in the high impedance state, i.e. non-conductive.

When the transistors associated with a packet connection $Z_k$ are in the passing or conductive state, they then allow the passage of row signals $F_i$ on the corresponding rows $l_i$ of packet $P_k$ and column signals $G_j$ on the corresponding column $c_j$ of packet $T_j$. The superimposing of these signals brings about the display or extinction of the corresponding image points, respectively when the signals $F_i$ and $G_j$ are in phase or in phase opposition.

When these transistors are non-conductive, no signal passes on the rows and columns of packets $P_k$ and $T_k$, the amplitude of the signal seen by the corresponding image points decreases slowly, following the elapsing of the storage time corresponding to the row time $T_L$.

Thus, in the embodiment of FIG. 3, the signal $R_{111}$ corresponding to the superimposing of a row signal $F_1$ applied to the connection $X_1$, of a column signal $G_1$ applied to connection $Y_1$ and a packet signal $H_1$ applied to connection $Z_1$ is zero at the start of a half-cycle T/2 during a row time $T_L$, due to signals $F_1$ and $G_1$ being in phase during the passing state of the transistors associated with $L_1$ and column $c_1$ selected by the packet signal $Z_1$. This zero signal then persists throughout the duration of the time $T_L$ corresponding to the storage time. This results in the display of a black image point $I_{111}$.

At the end of this first row time $T_L$, as the row signal $F_1$ is zero for the remainder of time T/2, signal $R_{111}$ will be that of the column signal $G_1$ at the time when packet signal $H_1$ selects the passing state of the transistor corresponding to said small column strip $c_1$. As the amplitude of the column signal is below the threshold voltage value of the liquid crystal, the black display at point $I_{111}$ will persist over the remainder of time T/2. This applies to each time T/2.

For the image point $I_{121}$ corresponding to the superimposing of a row signal $F_1$ applied to connection $X_1$, of a column signal $G_2$ applied to connection $Y_2$ and a packet signal $H_1$ applied to connection $Z_1$, at the start of a half-cycle T/2 for time $T_L$, the resulting signal $R_{121}$ has an amplitude equal to the sum of the amplitudes in absolute value of the row signal $F_1$ and the column signal $G_2$, due to the fact that these signals are in phase opposition during the passing state of the transistors, associated with row $l_1$ and column $c_2$ selected by the packet signal $H_1$, so that there is a white point $I_{121}$. As for point $I_{111}$, as signal $F_1$ is zero for the remainder of the time T/2, signal $R_{121}$ is dependent on the column signal $G_2$ applied to connection $Y_2$ when the transistor of column $c_2$ is selected by packet signal $H_1$. The white display at point $I_{121}$ consequently persists over the remainder of time T/2 and this applies to each half-cycle T/2.

The three-dimensionally controlled display described hereinbefore, i.e. which uses three types of signals applied to three types of connections, makes it possible to have ratios between the number of displayed points (s·t·p) and the number of connection (s+t+p) and between the number of displayed points (s·t·p) and the number of transistors (s+t)·p used, which are superior to those of the known display means.

What is claimed is:

1. A process for the control of a display having a first and a second facing insulating walls, respectively covered by m electrode rows $L_a$ and q electrode columns $C_b$, a and b being integers such $1 \leq a \leq m$ and $1 \leq b \leq q$, said electrode rows and electrode columns crossing one another; said display having a liquid crystal layer placed between electrode rows and electrode columns; said display having means for applying electrical signals to said electrode rows and electrode columns for exciting the liquid crystal, each electrode row being constituted by n aligned row strips and each electrode column being constituted by r aligned column strips, said row strips being grouped into p first packets of s parallel row strips and said column strips being grouped into p second packets of t parallel column strips, with $p = n \times r$, $s = m \times n/p$ and $t = q \times r/p$, an image point $I_{ijk}$ being defined by the region corresponding to the superimposing of a row strip $l_i$ of a first packet $P_k$ and a columns strip $c_j$ of the corresponding second packet $T_k$, i, j, and k being integers such that $1 \leq i \leq s$, $1 \leq j \leq t$ and $1 \leq k \leq p$; said display having $m \times n$ first transistors formed on said first wall and serving on the one hand to interconnect the n row strips of each electrode row, and to interconnect the n electrode rows in order to form s first connections and on the other hand to interconnect the s row strips of each packet in order to form p second connections; and said display having $q \times r$ second transistors formed on said second wall and serving on the one hand to interconnect the r column strips of each electrode column, and to interconnect the electrode columns in order to form t third connections and on the other hand to interconnect the t column strips of each second packet in order to form p fourth connections respectively connected to said p second connections; said process comprising the steps of continuously applying to said t third connections first cyclic electric signals of cycle T with polarity reversal for each half-cycle T/2, said first signals being alternately positive and then negative on each half-cycle T/2, applying to said s first connections second cyclic pulse-type electric signals of cycle T with polarity reversal for each half-cycle T/2, each second signal being non-zero during a time $T_L = T/(2 \times s)$, all the times $T_L$ being distributed over a half-cycle T/2, and applying to said p second and fourth connections third cyclic pulse-type electric signals of cycle $T_L$, each third signal being non-zero during a time $T_c = T_L/p$, all the times $T_c$ being distributed over a time $T_L$, $T_c$ corresponding to the charging time of the transistors.

2. A control process according to claim 1, wherein said first signals and said second signals are in phase.

3. A control process according to claim 1, wherein said third signals turn on said transistors.

4. A control process according to claim 1, wherein said first, second and third electrical signals are square-wave signals.

5. A control process according to claim 1, wherein said first signals and said second signals are in opposite phase.

6. A control process according to claim 1, wherein said third signals turn off said transistors.

* * * * *